(12) United States Patent
Westcott

(10) Patent No.: US 10,877,490 B2
(45) Date of Patent: Dec. 29, 2020

(54) SELF-CLOSING AQUARIUM VALVE

(71) Applicant: Vern Westcott, Bellevue, NE (US)

(72) Inventor: Vern Westcott, Bellevue, NE (US)

( * ) Notice: Subject to any disclaimer, the term of this patent is extended or adjusted under 35 U.S.C. 154(b) by 0 days.

(21) Appl. No.: 16/389,441

(22) Filed: Apr. 19, 2019

(65) Prior Publication Data

US 2020/0333807 A1    Oct. 22, 2020

(51) Int. Cl.
*F16K 31/22* (2006.01)
*F16K 7/06* (2006.01)
*F16K 31/18* (2006.01)
*G05D 7/01* (2006.01)
*F16K 31/08* (2006.01)
*A01K 63/00* (2017.01)
*G05D 9/02* (2006.01)

(52) U.S. Cl.
CPC ......... *G05D 7/0146* (2013.01); *A01K 63/006* (2013.01); *F16K 7/061* (2013.01); *F16K 31/084* (2013.01); *F16K 31/22* (2013.01); *F16K 31/18* (2013.01); *G05D 9/02* (2013.01); *Y10T 137/2768* (2015.04)

(58) Field of Classification Search
CPC ........ F16K 21/18; F16K 21/185; F16K 31/22; F16K 7/06; F16K 7/061; G05D 9/02; G05D 7/0146; Y10T 137/2768; Y10T 137/7394; A01K 63/006; A01K 63/04
See application file for complete search history.

(56) References Cited

U.S. PATENT DOCUMENTS

| | | | | |
|---|---|---|---|---|
| 2,842,158 A | * | 7/1958 | Robinson | F16K 31/22 137/428 |
| 3,895,605 A | * | 7/1975 | Goldman | A01K 63/006 119/245 |
| 5,090,443 A | * | 2/1992 | Jacobsen | A01G 27/003 137/429 |
| 2010/0212598 A1 | * | 8/2010 | Jones | A01K 63/006 119/269 |

FOREIGN PATENT DOCUMENTS

GB            945051 A  * 12/1963  ............. F16K 31/22

* cited by examiner

*Primary Examiner* — Hailey K. Do
(74) *Attorney, Agent, or Firm* — Baird Holm LLP

(57) ABSTRACT

Self-closing aquarium valves to consistently acclimate fish to temperature and pH of a new tank with minimal monitoring are described. The self-closing aquarium valve includes a frame, an automatic stopper hingedly connected to the frame that closes automatically, and a hose that provides fluid communication from the new tank to a holding tank, and an adjustable flow control. The self-closing aquarium valve provides consistent acclimation of a fish from the holding tank to a new tank through the adjustable flow control with minimal monitoring with the automatic stopper.

9 Claims, 4 Drawing Sheets

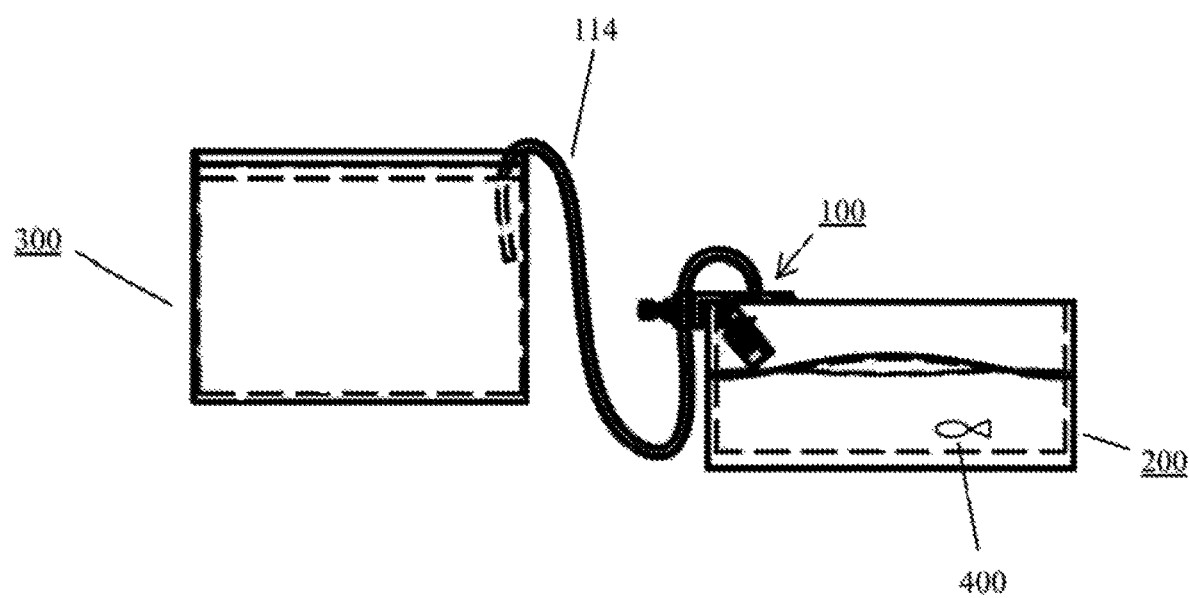

SELF-CLOSING AQUARIUM VALVE

BACKGROUND

Properly acclimating fish to a new aquarium environment increases the likelihood that the fish will survive in the new aquarium environment (e.g. new tank). Acclimating a fish to a new aquarium includes equilibrating the temperature and pH between the fish's current environment of a transport bag, transport tank, or the like (e.g. a holding tank) and the new tank. Conventional methods of acclimating fish include the bag floating method and the drip method.

The conventional bag floating method includes inserting the holding tank into the new tank for a period time (e.g. 15 minutes) to begin to equilibrate temperature of the holding tank and the new tank. After the period of time, water from the new tank is periodically (e.g. every 5 minutes) added to the holding tank in small portions (e.g. 118 milliliters (4 fluid ounces)) until the holding tank is full, allowing the temperature and pH of the holding tank to equilibrate. Once the holding tank is full, half of its water is discarded, and then water from the new tank is periodically added to the holding tank until it is once again full, further equilibrating the pH and temperature of the holding tank to the new tank. Finally, the fish is transferred from the holding tank to the new tank, such as via a net. The bag floating method requires numerous manual steps to be carried out by a user. Further, the bag floating method does not achieve consistent acclimation, as the fish is exposed to tank water at 118 milliliter portions.

The conventional drip method includes running tubing from the new tank to the holding tank. A siphon is initiated from the new tank to the holding tank to allow water from the new tank to flow to the holding tank. To control the flow of water loose knots may be tied in the tubing. Once the flow rate is adjusted, the holding tank is monitored until it is nearly full or the water volume doubles over the course of approximately an hour. Upon reaching capacity or the volume doubling, half of the water is emptied from the holding tank, and the siphon is initiated again to allow water to flow from the new tank to the holding tank. The holding tank is again monitored until it is at capacity or the water volume doubles over the course of approximately an hour. While the dripping method allows for more consistent acclimation of temperature and pH by adjusting the flow rate, it requires intensive manual monitoring and intervention. The adjustment of the flow rate is not consistent and requires manual manipulation of tying and untying knots to achieve the desired flow rate. Further, if the holding tank and siphon are not appropriately monitored, the holding tank will overflow, which may cause fish to be expelled from the holding tank leading to their harm or death.

It is therefore desirable to have an apparatus that allows for consistent acclimation of fish between the holding tank and the new tank. It is further desirable to have an apparatus that minimizes manual intervention to reduce the risk of harm to fish during the acclimation process.

FIGURES

FIG. 1 represents a self-closing aquarium valve administering acclimation of a fish by equilibrating a holding tank to a new tank.

SUMMARY

Figure 2A:
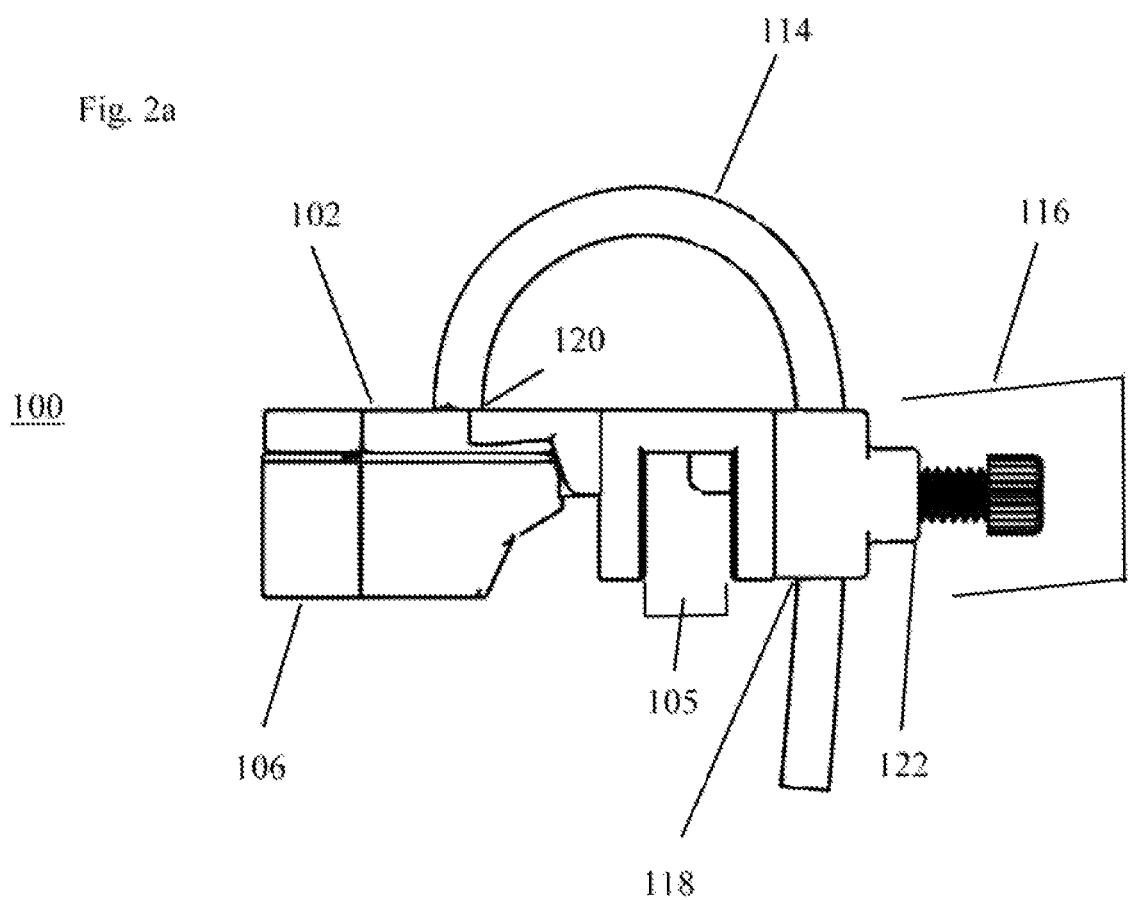
FIG. 2a represents a side view of the self-closing aquarium valve in a closed position.

In aspects of a self-closing closing aquarium valve, the self-closing aquarium valve device includes a frame, the frame comprising an attachment channel formed from the frame, a top magnet in fixed communication with the frame proximal to the attachment channel, a channel configured to receive a hose, the channel adjacent to the attachment channel and proximal to the top magnet, a water delivery aperture configured to receive the hose, the water delivery aperture formed from the frame, wherein a terminal end of the hose resides in the water delivery aperture, and an adjustable flow control aperture configured to receive an adjustable flow control, wherein the adjustable flow control aperture is in mechanical communication with the channel; an automatic stopper hingedly connected to the frame having a density less than a density of water, the automatic stopper comprising a bottom magnet configured to assist the automatic stopper in automatic closing, wherein the bottom magnet is in fixed communication with the automatic stopper opposite the top magnet of the frame and the hose, and a plug configured to be received by the water delivery aperture; and the adjustable flow control configured to adjust the flow rate of water through the hose, wherein the adjustable flow control is in mechanical communication with the adjustable flow control aperture of the frame; and the hose in friction communication with the channel and in fluid communication with the water delivery aperture, wherein the hose has a slightly larger diameter than the channel.

In other aspects of a self-closing aquarium valve, the self-closing aquarium valve device, the self-closing aquarium valve device includes a frame, the frame comprising an attachment means for attaching the self-closing aquarium valve device to a holding tank, a top magnet in fixed communication with the frame proximal to the attachment means, a channel configured to receive a hose, the channel adjacent to the attachment means and proximal to the top magnet, a water delivery aperture configured to receive the hose, the water delivery aperture formed from the frame, wherein a terminal end of the hose resides in the water delivery aperture, and an adjustable flow control aperture configured to receive an adjustable flow control means, wherein the adjustable flow control aperture is in mechanical communication with the channel; an automatic stopper means for automatically sealing the water delivery aperture, the automatic stopper means hingedly connected to the frame; the adjustable flow control means for adjusting the flow rate of water through the hose, the hose in friction communication with the channel and in fluid communication with the water delivery aperture, wherein the hose has a slightly larger diameter than the channel.

In other aspects, an acclimation method for acclimating a fish to a new tank with a self-closing aquarium valve, the method including creating a siphon in a self-closing aquarium valve; initiating flow from the new tank to a holding tank containing the fish; adjusting the flow to a desired flow rate; sealing the self-closing aquarium valve automatically with minimal human intervention; transferring the fish from the holding tank to the new tank.

DETAILED DESCRIPTION

Self-closing aquarium valves to consistently acclimate fish to temperature and pH of a new tank with minimal monitoring are described. The self-closing aquarium valve includes a frame, an automatic stopper hingedly connected to the frame that closes automatically, and a hose that provides fluid communication from the new tank to a holding tank, and an adjustable flow control. The self-closing aquarium valve provides consistent acclimation of a fish from the holding tank to a new tank through the adjustable flow control with minimal monitoring with the automatic stopper.

FIG. 1 represents a self-closing aquarium valve administering acclimation of a fish 400 from a new tank to a holding tank. When the self-closing aquarium valve is in an open position, the hose 114 provides fluid communication from a new tank 300 (e.g. an aquarium that is a new environment for the fish) to a holding tank 200 (e.g. a container that will temporarily house the fish while the fish acclimates to the new tank 300).

FIG. 2a represents a side view of the self-closing aquarium valve in a closed position. The self-closing aquarium valve 100 includes a frame 102, an automatic stopper 106, a hose 114, and an adjustable flow control 116. The frame 102 is from 2 to 10 millimeters (mm) in height, from 50 to 100 mm in length, and from 15 to 50 mm in width. The frame may be formed from any non-corrosive material, such as stainless steel, acrylonitrile butadiene styrene, polyamide, or thermosetting polymers.

Figure 2B:
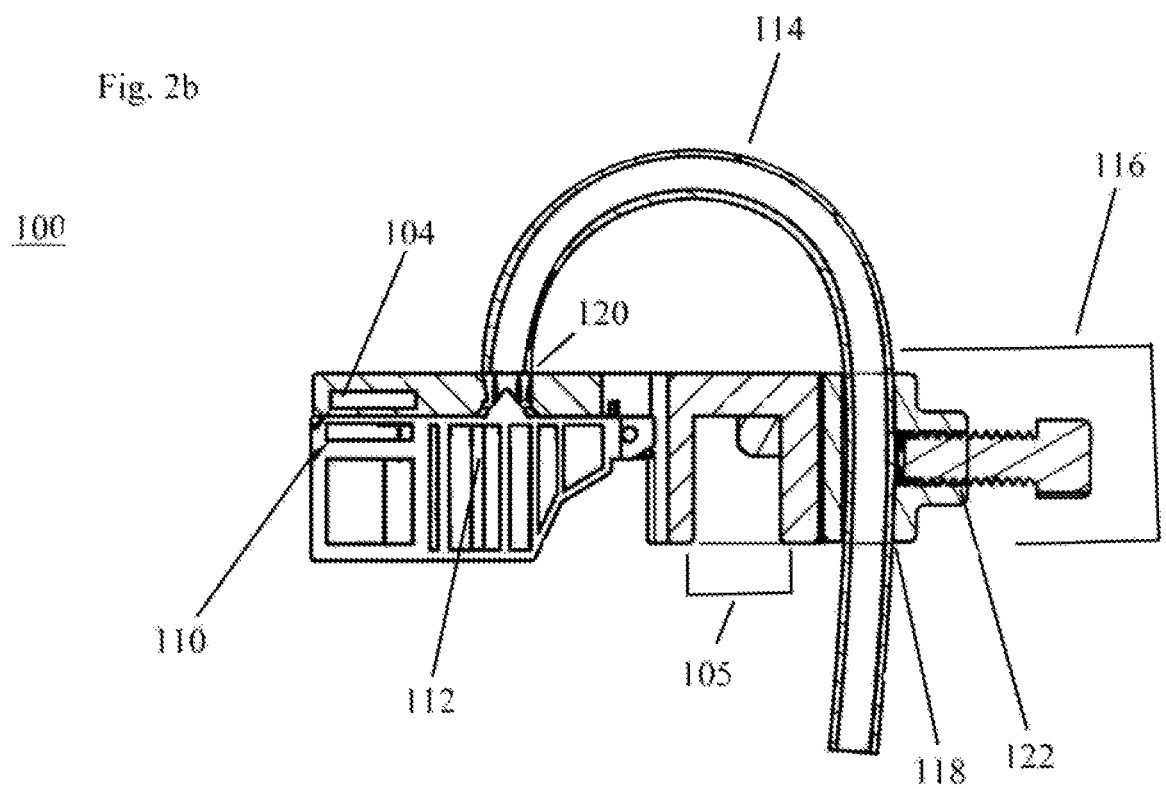
FIG. 2b is a transparent representation of a side view of the self-closing aquarium valve in the closed position.

The frame 102 of the self-closing aquarium valve includes an attachment channel 105, a channel 118, a water delivery aperture 120, an adjustable flow control aperture 122, and a top magnet 104 (see FIG. 2b). The attachment channel 105 is configured to provide removable attachment of the self-closing aquarium valve 100 to the holding tank 200. The attachment channel 105 may be formed as a part of the frame 102 and is adjacent to the channel 118. The attachment channel 105 may be from 10.21 to 15 mm in width and from 10 to 25 mm in height. The attachment channel 105 may include a compressible material, such as foam, neoprene, or rubber that enhances the attachment of the frame 102 to the holding tank 200, while maintaining removable attachment.

The channel 118 of the frame 102 receives the hose 114. The channel 118 may be formed as part of the frame 102 and is adjacent to the attachment channel 105. The channel 118 may be of any shape to receive the hose 114, such as rectangular or spherical, where the diameter or width of the channel 118 is slightly smaller (e.g. 0.1 to 0.4 mm larger) than an outer diameter of the hose 114, providing a friction fit (e.g. friction communication) between the channel 118 and the hose 114. The channel 118 is from 4 to 10 mm in width or diameter.

The hose 114 may be tubing of a strength to withstand compression and having resiliency to return to its normal form after compression. For example, the hose 114 may be silicon tubing. The hose 114 may have an internal diameter from 2 to 7 millimeters (0.08 to 0.28 inches), and the hose 114 may have an outside diameter from 4 to 11 millimeters (0.016 to 0.43 inches). The hose 118 is received by the channel 118 and the water delivery aperture 120.

The water delivery aperture 120 is configured to receive the hose 114 to deliver water from the new tank 300 to the holding tank 200. A terminal end of the hose 114 resides in the water delivery aperture 120, where the hose 114 and the water delivery aperture 120 are in fluid communication. The water delivery aperture 120 may be formed as a part of the frame 102 and is distal to the channel 118. The water delivery aperture 120 may be of any shape to receive the hose 114, such as rectangular or spherical.

The adjustable flow control aperture 122 is configured to receive the adjustable flow control 116. The adjustable flow control aperture 122 is in mechanical communication with the channel 118. The adjustable flow control aperture 122 may be of any shape to receive the adjustable flow control 116, such as rectangular or spherical. The adjustable flow control aperture 122 has a width or diameter to accommodate the adjustable flow control, such as a diameter to accommodate the adjustable flow control 116 that is a M6×1 (¼ inch×20 thread) screw.

The top magnet 104 of the frame 102 is configured to seal and maintain the self-closing aquarium valve 100 in the closed position. The top magnet 104 may be a neodymium magnet. The top magnet 104 is in fixed communication with the frame 102 at a vertical location opposite the automatic stopper 106 and proximal to the attachment channel 105.

The automatic stopper 106 of the self-closing aquarium 100 is configured to allow acclimation of the holding tank 200 to the new tank 300 in the open position. The automatic stopper 106 is further configured to provide automatic sealing of the delivery aperture 120 to prevent the flow of water from the new tank 300 to the holding tank 200 in the closed position with minimal or no human intervention. The automatic stopper 106 is hingedly connected (i.e. connected in a hinging manner) to the frame 102, adjacent to the attachment channel 105. The automatic stopper 106 is from 20 to 60 mm in length, 12 to 22 mm in height, and from 15 to 50 mm in width. The automatic stopper 106 has a density less than the water of the new tank (e.g. 0.9982 grams per cubic milliliter for fresh water; 1.0240 grams per cubic milliliter), such that as the water of the holding tank 200 rises, the stopper 106 floats on the water of the holding tank 200. The automatic stopper 106 includes a bottom magnet 110 and a plug 112 (See FIGS. 2b, 3a, and 3b).

The bottom magnet 110 of the automatic stopper 106 is configured to assist the automatic stopper 106 in closing automatically as the water level of the holding tank reduces the vertical distance between the automatic stopper 106 and the top magnet 104. The bottom magnet is further configured to maintain the self-closing aquarium valve 100 in the closed position. The bottom magnet 110 has a pulling force of at least 1.36 kg (3 pounds). The bottom magnet 110 is in fixed communication with the automatic stopper 106 at a vertical location opposite the top magnet 104 of the frame 102.

The adjustable flow control 116 of the frame 102 is allows adjustment of the flow rate of water from the new tank 300 to the holding tank 200 via the hose 114. The adjustable flow control 116 is in mechanical communication with the frame 102 via the adjustable flow control aperture 122. The adjustable flow control 116 is in further mechanical communication with the hose 114 via the adjustable flow control aperture 122 to adjust the flow rate of water by compressing or decompressing the hose 114. The adjustable flow control 116 may be a bolt, a screw, or pinch valve. The adjustable flow control 116 controls the flow of water through the hose 114 based on the position (e.g. open or closed) of the adjustable flow control 116 and the height of the new tank as compared to the height of the holding tank (i.e. height differential).

For example, the table below shows flow rates as measured over a 30 second period, when the hose 114 of the self-closing aquarium valve 100 has the internal diameter of 6 mm and the adjustable flow control 116 (i.e. in this example a screw) in the identified position.

| Height Differential | Adjustable Flow Control Position | | | |
|---|---|---|---|---|
| | Fully open | ¼ turn closed | ½ turn closed | ¾ closed |
| 0.30 meters (1 foot) | 88.7 milliliters (mL) (3 ounces (oz.)) | 59.1 mL (2 oz.) | 44.4 mL (1½ oz.) | 1.8 mL (1/16 oz.) |
| 0.61 meters (2 feet) | 162.7 mL (5½ oz.) | 118.3 mL (4 oz.) | 59.1 mL (2 oz.) | 3.7 mL (⅛ oz.) |
| 0.91 meters (3 feet) | 236.6 mL (8 oz.) | 147.9 mL (5 oz.) | 88.7 mL (3 oz.) | 11.1 mL (⅜ oz.) |
| 1.22 meters (4 feet) | 266.2 mL (9 oz.) | 177.4 mL (6 oz.) | 103.5 mL (3½ oz) | 14.8 mL (½ oz.) |
| 1.52 meters (5 feet) | 295.7 mL (10 oz.) | 221.8 mL (7.5 oz.) | 118.3 mL (4 oz.) | 22.2 mL (¾ oz.) |

FIG. 2b is a transparent representation of a side view of the self-closing aquarium valve 100 in the closed position. FIG. 2b illustrates the plug 112 of the automatic stopper 106. The plug 112 is received by the water delivery aperture 120. The plug 112 has a diameter or dimensions substantially equal to, but smaller than, the diameter or dimensions of the water delivery aperture 120 configured to seal the water delivery aperture 120 in the closed position to prevent water from entering the holding tank 200. The plug 112 may be formed as part of the automatic stopper 106. In the closed position, the top magnet 104 and the bottom magnet 110 are in magnetic communication and the plug 112 is received by the water deliver aperture 120 to prevent water from flowing from the new tank 300 to the holding tank 200.

Figure 3A:
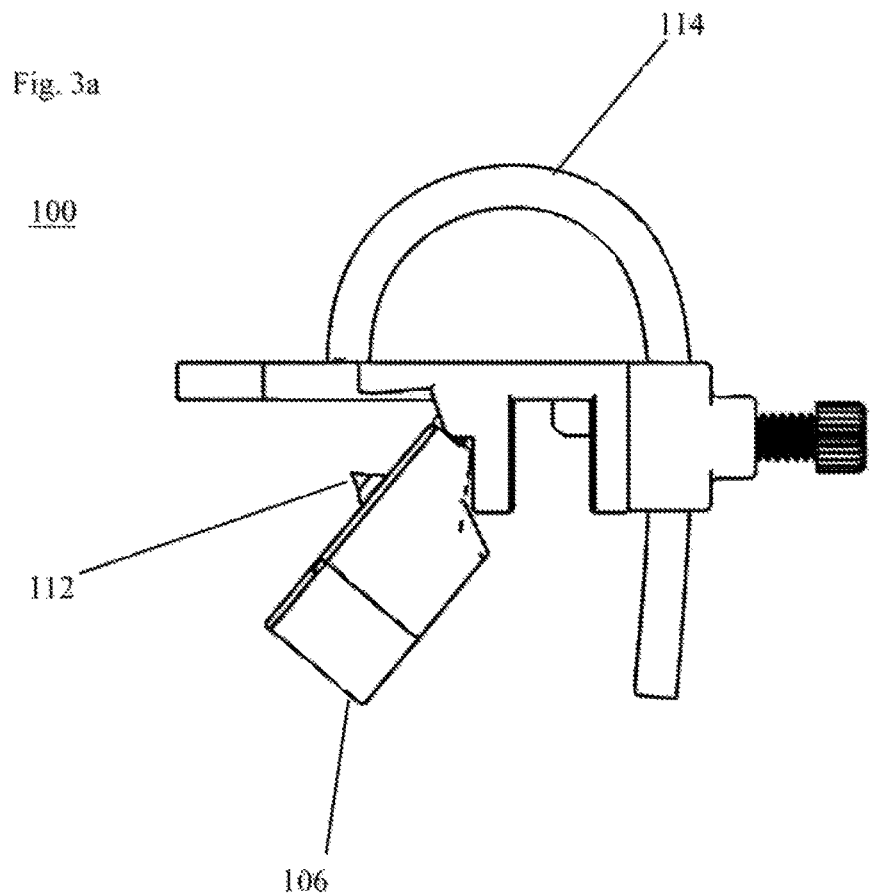
FIG. 3a represents a side view of the self-closing aquarium valve in an open position.
Figure 3B:
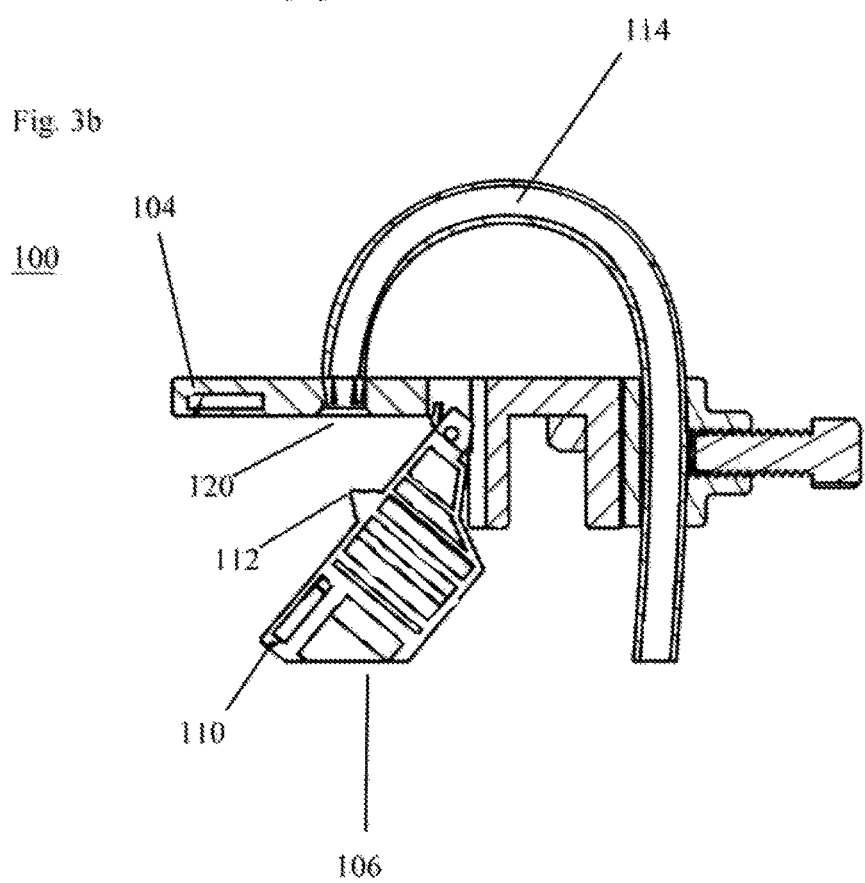
FIG. 3b is a transparent representation of the self-closing aquarium valve in the open position.

FIGS. 3a and 3b represents a side view of the self-closing aquarium valve 100 in an open position. In the open position the top magnet 104 and the bottom magnet 110 are not in magnetic communication and the plug 112 is not received by the water delivery aperture 120 such that water flows from the new tank 300 to the holding tank 200 as controlled by the adjustable flow control 116.

FIG. 3b is a transparent representation of the self-closing aquarium valve in the open position showing the terminal end of the hose 114 residing in the water delivery aperture 120.

Figure 4:
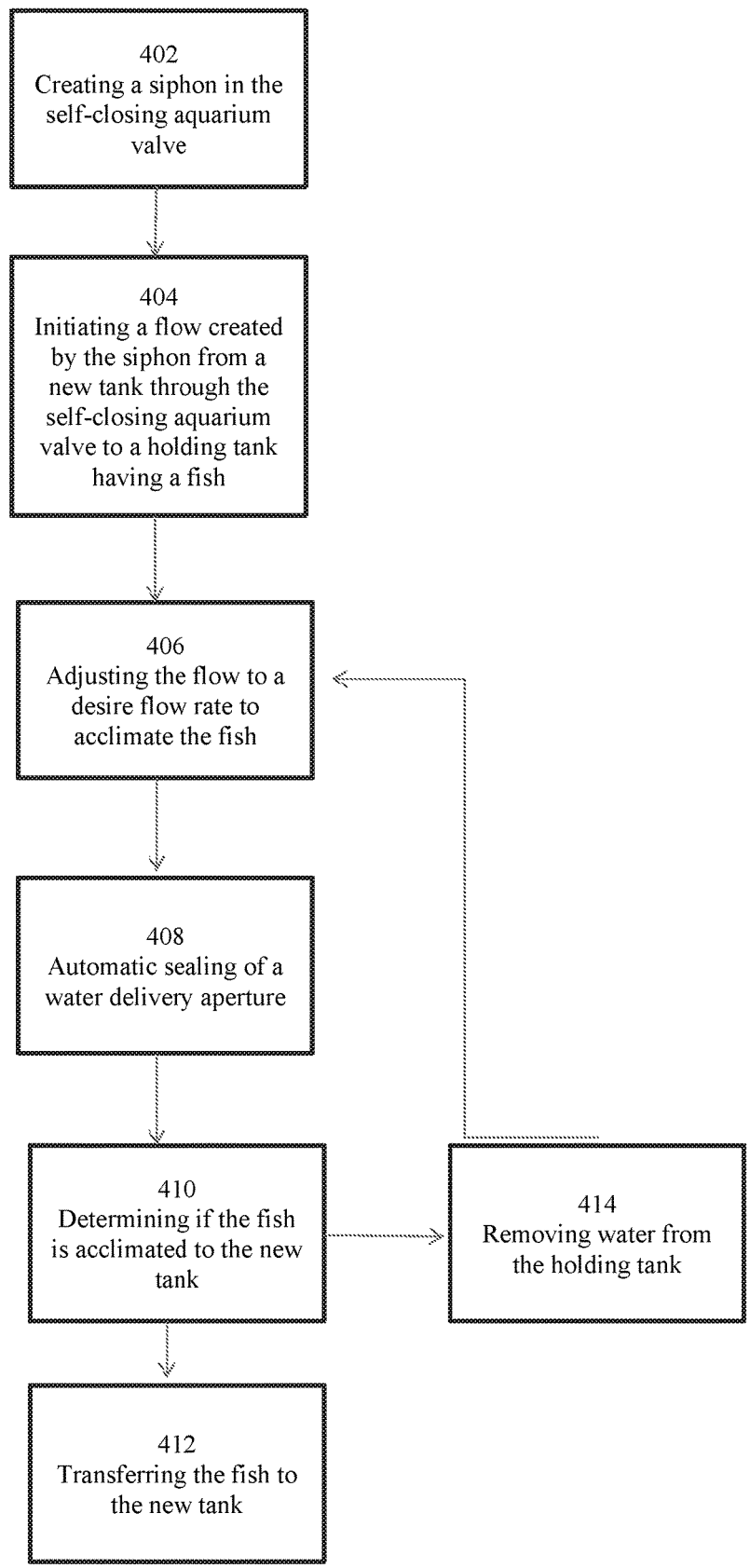
FIG. 4 represents an acclimation method of the self-closing aquarium valve.

FIG. 4 represents an acclimation method using the self-closing aquarium valve to acclimate a fish to a new tank using a holding tank. In 402, a siphon is created in the self-closing aquarium valve in a hose 114. For example, the siphon may be created by submerging the entirety of the hose 114 with the self-closing aquarium valve 100 in the open position, in the new tank and when filled with water plugging an end of the hose 114. The siphon may further be created by using a syringe to fill the hose 114 with water from the new tank, and further the siphon may be created by creating negative pressure in the hose 114.

In 404, once the siphon in the hose 114 of the self-closing aquarium valve is achieved, flow is initiated from the new tank to the holding tank containing the fish by placing the end of the hose 114 in the holding tank. In 406, the flow is adjusted to a desired flow rate by moving the position of an adjustable flow control 116. The desired flow rate is selected based on the acclimation needs of the fish, such as sensitivity to temperature and pH.

In 408, upon adjusting the adjustable flow control 116 to the desired flow rate, water flows from the new tank to the holding tank until an automatic stopper 106 automatically seals the water delivery aperture 120 to stop the flow of water to the holding tank. In 410, once the flow of water has automatically ceased, it is determined whether the fish requires further acclimation prior to transfer to the new tank. If the fish does not require further acclimation, in 412, the fish is transferred to a new tank. If the fish does require further acclimation, in 414 water is removed from the holding tank, where the removing includes moving the self-closing aquarium valve to the open position, and the steps of 406, 408, and 410 are repeated one or more times.

The invention claimed is:

1. A self-closing aquarium valve device, the self-closing aquarium valve device comprising:
   a frame, the frame comprising
      an attachment channel formed from the frame,
      a top magnet in fixed communication with the frame proximal to the attachment channel,
      a channel configured to receive a hose, the channel adjacent to the attachment channel and proximal to the top magnet,
      a water delivery aperture configured to receive the hose, the water delivery aperture formed from the frame, wherein
         a terminal end of the hose resides in the water delivery aperture, and
      an adjustable flow control aperture configured to receive an adjustable flow control, wherein
         the adjustable flow control aperture is in mechanical communication with the channel;
   an automatic stopper hingedly connected to the frame having a density less than a density of water, the automatic stopper comprising
      a bottom magnet configured to assist the automatic stopper in automatic closing, wherein
         the bottom magnet is in fixed communication with the automatic stopper opposite the top magnet of the frame and the hose, and
      a plug configured to be received by the water delivery aperture; and
   the adjustable flow control configured to adjust the flow rate of water through the hose, wherein
      the adjustable flow control is in mechanical communication with the adjustable flow control aperture of the frame; and
   the hose in friction communication with the channel and in fluid communication with the water delivery aperture, wherein
      the hose has a slightly larger diameter than the channel.

2. The self-closing aquarium valve device of claim 1, wherein
   the channel is formed from the frame.

3. The self-closing aquarium valve device of claim 1, wherein
   the frame is a material selected from a group consisting of acrylonitrile butadiene styrene, polyamide, and thermosetting polymers.

4. The self-closing aquarium valve device of claim 1, wherein
   the hose is silicon tubing.

5. The self-closing aquarium valve device of claim 4, wherein
   the attachment channel further comprises a compressible material selected from a group consisting of foam, neoprene, or rubber.

6. A self-closing aquarium valve device, the self-closing aquarium valve device comprising:
   a frame, the frame comprising an attachment means for attaching the self-closing aquarium valve device to a holding tank, a top magnet in fixed communication with the frame proximal to the attachment means, a channel configured to receive a hose, the channel adjacent to the attachment means and proximal to the top magnet, a water delivery aperture configured to receive the hose, the water delivery aperture formed from the frame, wherein a terminal end of the hose resides in the water delivery aperture, and an adjustable flow control aperture configured to receive an adjustable flow control means, wherein the adjustable flow control aperture is in mechanical communication with the channel;

an automatic stopper means for automatically sealing the water delivery aperture, the automatic stopper means hingedly connected to the frame;

the adjustable flow control means for adjusting the flow rate of water through the hose, the hose in friction communication with the channel and in fluid communication with the water delivery aperture, wherein the hose has a slightly larger diameter than the channel.

7. The self-closing aquarium valve device of claim 1, wherein the channel is formed from the frame.

8. The self-closing aquarium valve device of claim 1, wherein the hose is silicon tubing.

9. The self-closing aquarium valve device of claim 1, wherein the frame is a material selected from a group consisting of acrylonitrile butadiene styrene, polyamide, and thermosetting polymers.

* * * * *